United States Patent [19]
Shihadeh

[11] 3,980,597
[45] Sept. 14, 1976

[54] MAKING A SEALING COMPOSITION AND A SEALING COMPOSITION FOR ROOFS AND THE LIKE

[75] Inventor: Musa Shihadeh, Kearny, N.J.

[73] Assignee: Guard Polymer & Chemical, Inc., Kearny, N.J.

[22] Filed: May 24, 1971

[21] Appl. No.: 146,203

[52] U.S. Cl. ............................................. 260/28 R
[51] Int. Cl.² ........................................ C08L 95/00
[58] Field of Search .................. 260/28, 28.5 AS

[56] References Cited
UNITED STATES PATENTS

| | | | |
|---|---|---|---|
| 3,372,083 | 3/1968 | Evans | 260/28 |
| 3,440,073 | 4/1969 | Fowler | 260/28 |
| 3,505,275 | 4/1970 | Sato | 260/28 |
| 3,634,293 | 1/1972 | Bonitz | 260/28.5 AS |
| 3,637,558 | 1/1972 | Verdol | 260/28.5 AS |
| 3,673,141 | 6/1972 | Trieschmann | 260/28.5 AS |

*Primary Examiner*—Paul R. Michl
*Attorney, Agent, or Firm*—Karl F. Ross; Herbert Dubno

[57] ABSTRACT

A sealing composition for roofs, floors, decks and other surfaces is composed of a polyurethane composition containing bituminous material which has been dehydrated and chemically neutralized to avoid the formation primarily of a gel and to preclude preliminary curing of the polyurethane prepolymer. A self-supporting film of similar composition is also disclosed.

5 Claims, 2 Drawing Figures

MAKING A SEALING COMPOSITION AND A SEALING COMPOSITION FOR ROOFS AND THE LIKE

FIELD OF THE INVENTION

My present invention relates to compositions for sealing and surfacing a supporting structure and, more particularly to a sealing composition containing a polyurethane and a bitumen.

The invention also relates to a method of preparing such compositions, to the completed structure including the composition and the support, and fully prepared compositions for direct application to a support structure as well as compositions which are to be formed at an application site. In addition, my invention applies to roof-surfacing materials, methods of making same and roof structures using sealing layers of polyurethane-bitumen compositions.

BACKGROUND OF THE INVENTION

In the construction trades and elsewhere, it has long been desirable to prepare a foamed or nonfoamed sealer which can be applied directly from its container or formed in a simple manner at the application site, for the coating of surfaces, e.g. roofs, to seal the latter against the weather. Heretofore it has been necessary in most cases, to provide upon a roof structure, one or more layers of felt paper and then to coat the surface with a bitumen. Rubber-containing, rubber-like and rubberized compositions have also been proposed as sealants, coating materials and self-supporting sealing layers for these purposes and others. It is desirable in the formation of such layers that the material have a high tenacity, durability, resistance to weathering, flexibility and coating capability in the sense that the material is able to flow naturally over the entire surface, bond thereto and cure to a film or layer free from pinholes or other openings. For the most part, prior-art systems have been unable to fulfill all of these requirements, have been difficult to apply, or have been excessively expensive or supplied in multi-component systems.

I may also mention efforts which have been made to provide compositions of rubber-like materials, such as polyurethanes and bitumens. These efforts have uncovered the phenomenon that bituminous materials react with polyurethane prepolymers to cause premature gelling or partial curing and otherwise detrimentally affect valuable properties which could be derived from the use of polyurethanes. It has been proposed in the art, for example, to negate or obviate such detrimental interaction by reacting the bitumen first with polyurethane prepolymer or isocyanates of the type used in the formation of polyurethanes, but these systems have been only limitedly successful and showed very slow curing.

OBJECTS OF THE INVENTION

It is, therefore, the general object of this invention to provide an improved system for the application to a supporting surface adapted to cure uniformly and homogeneously, to provide a weather-resistant, waterproof adherent and tough sealing and protective layer.

It is another object of the invention to provide a method of making a layer-forming system of the character described which will obviate the aforementioned disadvantages.

It is still another object of the invention to provide a roof structure embodying such an improved system and including a polyurethane-bitumen layer of high durability and tenacity and free from inhomogeneities characterizing other systems.

It is a further object of my invention to provide a one-component system of polyurethane prepolymer and bitumen, in which prereaction of the bitumen with isocyanates can be avoided and which can be applied to a support surface as, for example, a roofing material, which will materially reduce the requirements for pretreatment of the surface, will be of relatively low cost, can be applied simply, rapidly and conventionally by individuals of little skill, which will improve the sealing and weathering characteristics of the surface, and which will otherwise be free from the disadvantages noted earlier and from excessive gas formation, sponge formation and other drawbacks characterizing earlier systems using polyurethane for the same purposes.

It is another object of the invention to provide two-package systems which can be prepared more easily than hitherto known in the art with the improvements otherwise enumerated above.

Another object of the invention is to be found in a cured system of the improved composition for roof structures and the like of higher durability, uniformity, tenacity and freedom from maintenance.

It is also an object of my invention to provide a system of the general character described in improved ability to vary the compositions, to select, replace or combine components and to otherwise modify a packaged composition for application to a roof or other support surface without interfering with the stability of the package and with the ability to form the surfaces of markedly improved physical properties by comparison with earlier systems.

It is still another object of the invention to provide an improved water proof film or layer which needs little maintenance and can be applied or used conveniently and without undue attention to details of the composition or preliminary preparations by the workers applying the layer.

SUMMARY OF THE INVENTION

I have discovered, surprisingly, that all of the foregoing objects can be attained efficaciously by a method which involves a preliminary treatment of the bitumen to eliminate moisture therefrom and neutralize any excess acidity of the bitumen, prior to combining it with a polyurethane prepolymer.

More particularly, my discovery is based upon the fact that, while bitumens, such as pitch, tar or asphalt, are generally considered to be hydrophobic and free from moisture, such materials as are presently available nevertheless contain several percent by weight of water which is sufficient to react prematurely with large quantities of the prepolymer and hence render the latter unsuitable for surfacing compositions. However, systems in which this moisture is tied up by prereaction of the bitumen with polyurethane prepolymer, have introduced gel-formation to the system which is extremely detrimental, slow-curing, more water-sensitive, and a time-consuming process requiring heating equipment. The removal of such moisture by chemical or physical means, according to the invention, however, eliminates the tendency of the bitumen to react prematurely, with the polyurethane polymer and forms the basis for the advantageous systems described in detail below.

According to an aspect of this invention, therefore, the composition is a one-part (one-package) or two-part (two-package) system of a moisture and curable polyurethane prepolymer and a bitumen, e.g. a pitch, tar or asphalt, which can be blended with the polyurethane prepolymer and other additives such as fillers and plasticizers which are desirable therein, the bitumen having previously been treated by chemical or physical means to eliminate the moisture which otherwise would tend to preliminary the polyurethane prepolymer.

An important aspect of the invention is the pretreatment of the bitumen to eliminate the tar acids normally present therein and to effect therefore, a chemical neutralization of the bitumen. In this manner, I am able to prevent excess foaming of the composition formed in the prepolymer each combined with the tar at room temperature and to extend significantly the self-stability of a one-component system containing both the bitumen and the prepolymer. Advantageously, the isocyanate groups present in a one-component system should not exceed 10% by weight of the composition in terms of % NCO, this value having been found to be the upper limit if excess foaming is to be avoided. The two-component system, or two-package system, wherein the NCO content may be substantially higher, will generally also contain hydrogen-active components copolymerizable with the isocyanate to form the polyurethane, catalysts, fillers, plasticizers and any dehydrating or neutralizing acids which may be desirable. By ensuring that both components are moisture and acid free, it is possible to prevent gasing, the formation of pinholes, sponge formation and other disadvantages which otherwise would be present upon application of the film to the support surface.

Surprisingly, whereas water, carboxylic acids, amino groups and other hydrogen-active components partially cure or interact with polyurethane prepolymer and hence require that the prepolymer be packaged separately from the remainder of the composition, in accordance with my discovery the dehydration and chemical neutralization of at least the bitum and preferably all of the component in the system, completely obviates such interaction and allows all of the ingredients of the composition to be incorporated in one package together, with the reactive isocyanated prepolymer.

The present invention may be considered to involve, in its basics, a preliminary treatment of the bitumen or the prepolymer or both so as to eliminate or tie up detrimental ingredients, present in substantial quantity or in trace amounts, which otherwise cause premature curing of the prepolymer or premature interaction of the prepolymer with the bitumen. I have already mentioned direct chemical action to neutralize the acids of the bitumen and to dehydrate the latter. Broadly, other reaction physical and chemical operations may also be performed for the same end. For example, I may use principles of absorption or filtration whereby molecular sieves serve to trap or absorb the undesirable ingredients, adsorption in which contact with highly active surfaces such as alumina, thermal or vacuum dehydration and crystallization, contact with hydroscopic materials, or salt-forming neutralization may be used. I may also mention that the improved system of the present invention allows variation of the mixing ratios of a two-component system with respect to the desired volume and weight of the product to adapt the system to the mixing, spreading and spray equipment or technique which may be desirable. Viscosity and other rheological properties may be varied within wide ranges without rendering the package unstable or causing drastic changes in physical properties of the packaged components during storage, application and cure.

Moreover it has been found that my invention results in a composition having substantially no crosslinking or formation of urea or amide groups as may result from the reaction of moisture or organic and carboxylic acids with the isocyanate prepolymer. A low-frequency of crosslinking improves the elongation and reduces the modulus of elasticity of the product as is required with waterproof membranes adapted to span concrete slabs and to fill gaps between supporting structures. Even a slight tackiness which is characteristic of these systems, is an advantage in the formation of membranes adapted to span concrete slabs as indicated.

Broadly speaking, the bitumen may be any tar, pitch or asphalt, from any source whatsoever, which has a viscosity enabling it to be blended with the polyurethane, prepolymer, provided, of course, that the bitumen is treated to remove moisture and acidity. The bitumen includes the low-cost residues of petroleum refinery, petrochemical plant, coal distillation and even wood distillation industries, including the steel industries which perform a distillation of coal in the preparation of coke. The composition will generally also include fillers (0–30% by weight), plasticizers (0–20% by weight) and other conventional ingredients in addition to a catalyst (0–2.5% by weight). These ingredients, to the extent that they contain moisture or substances producing an acidity, are also preferably treated in accordance with the present invention to eliminate such moisture and acidity. Tars, pitches and bitumens which are suitable for use in accordance with the principles of this invention have been described by Abraham in Volume 1 of the work published by D. Van Nostrand Company, New York, 1945 (ASPHALT AND ALLIED SUBSTANCES, pages 56–59). However, certain bituminous materials have proved to be better than others and I prefer to make use of the tars of the CP type manufactured by Allied Chemicals Company, Plastics Division and identified as CP 524, CP 439 and CP 250 respectively. Other tars which have been found to be advantageous are those marketed by the Koppers Company Inc., New York. The preferred plasticizers of the present invention are those manufactured by Nevil Chemical Company under the trade designations X-734, BY-34-33 and Nebony. A typical tar, e.g. CP 524, may have a moisture content of 8% and a content of $CS_2$-insolubles of 9.0% by weight.

The ratio of the bitumen to the prepolymer may vary within a wide range, but I prefer to use sufficient bitumen so as to constitute at least 50% by weight of the cured product and advantageously up to 75% by weight thereof. The polyurethane prepolymer may be any of those described in U.S. Pat. No. 3,372,083 and below.

Advantageously, the bitumen has a boiling point in the range of 195°–340°C. Incidentally, since substantially any bitumen with the boiling point in this range and, as described in the cited work by Abraham, will be effective the particular bitumens mentioned in terms of their trade designations are merely examples of such bitumens, so that this definition (boiling point range) suffices to indicate the operative bitumens for the present invention.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
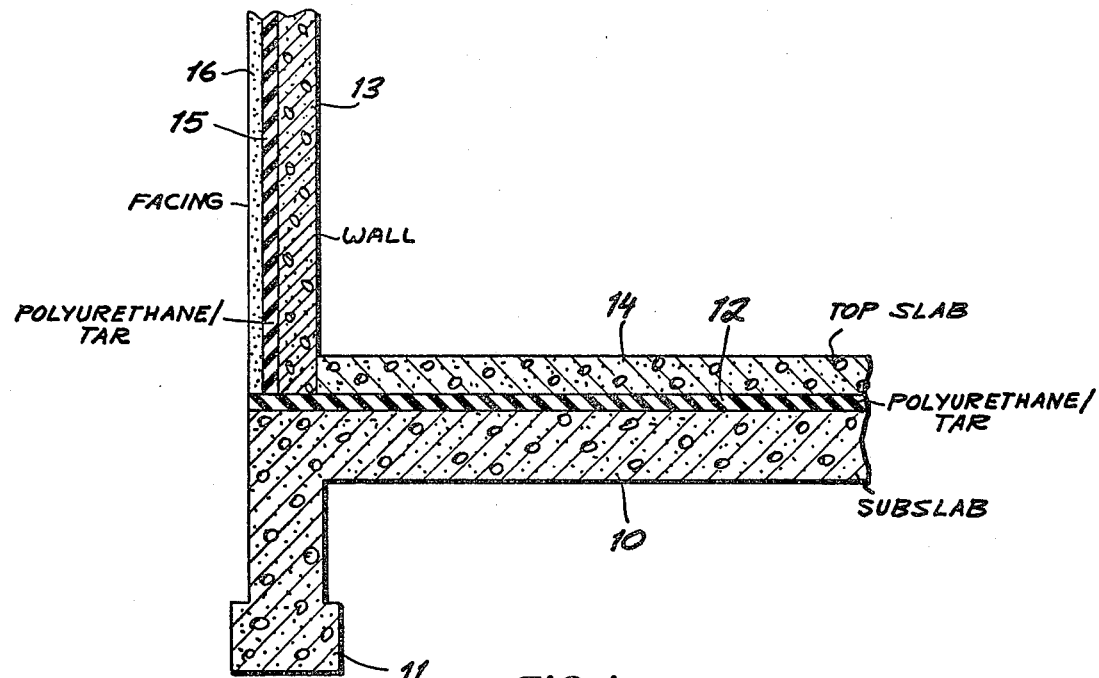
FIG. 1 is a cross section illustrating the application of the invention to a foundation coating.

In FIG. 1, I show a concrete foundation in which concrete top-slab 10 supported on footings 11 is cast in situ and is then coated at 12 with the polyurethane/tar composition of the present invention to a thickness of 30 to 100 mils, the thickness being exaggerated in the drawing. The wall 13 may then be erected and the reinforced-concrete top slab 14 cast in place. The exterior surface of the wall 13 is provided with a layer 15 of polyurethane/tar composition, again to a thickness of 30 to 100 mils and brick or other facing material, e.g. stucco is applied as shown at 16.

Figure 2:
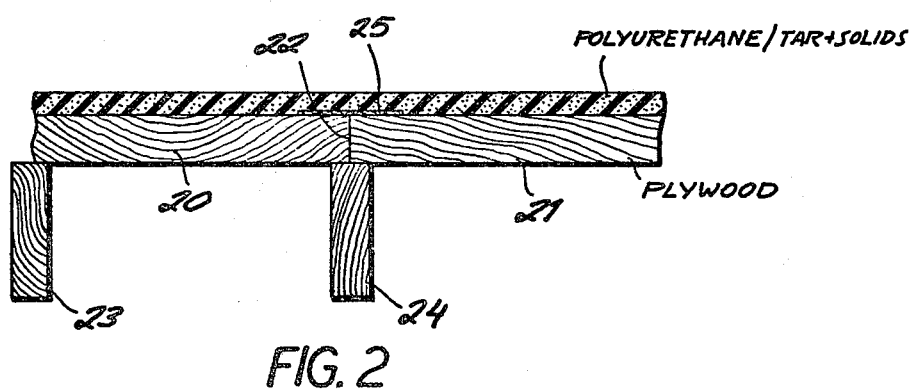
FIG. 2 is a cross-sectional view showing the use of the principles of the invention on a roof.

In FIG. 2, I show a roofing system in which plywood sheets 20 and 21 are butted at 22 and are supported by beams 23 and 24. A fabric layer 25, which I prefer to use but which is not essential, may be tacked in place over the joint and a layer 26 of the polyurethane/tar composition may be applied. In roofing applications of this type, the solids content should be high, i.e. at least 50% by weight of the composition. It should be noted for the purpose of the discussion below that a proportion of tar or polyurethane has been given with respect to the composition formed by them both. Thus, when I state that the bitumen is present in an amount of about 50% by weight of the composition, it is the composition formed by the prepolymer and the bitumen which I intend to designate. Hence, to this composition may be added pigments, fillers and the like in large proportions, say, to 50% by weight of the total mixture.

While in the drawing I have shown the use of the polyurethane/tar composition without certain substrates commonly in use with roofings, wall and foundation structures, various modifications may be made in accordance with conventional practice. For example, the liquid tar/polyurethane system may be applied over or under layers of thermal insulation, tar or felt paper, vinyl or rubber sheets or films, uncoated, painted or otherwise modified solid surfaces, with or without cloth or fiberglass underlays or inlays. Furthermore the polyurethane layer, also preferably applied in place by pouring, spraying or troweling, may be cast into sheets.

POLYURETHANE PREPOLYMER

The polyurethane prepolymer, according to the present invention, may be, as noted, be any of those listed in the aforementioned publication, provided the molecular weight lies between 1000 and 12,000 and the isocyanate (NCO) content is less than 20% by weight of the prepolymer. Basically such prepolymers are reaction products of organic isocyanates (diisocyanates) and two or more hydroxy groups of an organic molecule. Such hydroxy group may be present as a polyol (e.g. a polyester polyol, a polylactone polyol, a polyesteramide polyol, castor-oil polyols and mixtures thereof). The only limiting criterion, besides those given above, for the polyurethane prepolymer of the present invention is that it should be liquid or flowable at room or use temperature.

Preferably, the polyurethane prepolymer is a reaction product of toluene diisocyanate and diols or triols. For one-component or one-package systems, the prepolymer should have an isocyanate (NCO) content of no greater than 10% by weight and preferably less than 5% by weight and a molecular weight in the range of 2000 to 3000. As with moisture-carrying polyurethane generally, the polyurethane prepolymers of the present invention react with environmental moisture or moisture of the substrate to yield a carbon dioxide molecule from two molecules of prepolymer, thereby chaining the prepolymer molecules into the cured polyurethane structure. The evolution of carbon dioxide results in a certain amount of foaming which may be advantageous for the present invention in cases in which a cushion or cellular structure is desirable. Hence, where high-foam insulation coatings are desired, the polyurethane prepolymers of lower molecular weight and, therefore, greater frequency of bridging with release of carbon dioxide, are used. Where highly dense layers are desirable, I make use of higher molecular weight prepolymers, thereby reducing gas evolution and formation of cellular structures.

For two-component systems (two-package systems) I may use polyurethane prepolymers with isocyanate (NCO) content of up to 20% by weight of the prepolymer. In such two-component systems, at least one hydrogen-active material is provided in the component which is mixed with the prepolymer component to provide curing with a lesser evolution of carbon dioxide.

Below I have set out prepolymer-formation reactions which may be used for the purposes of the present invention.

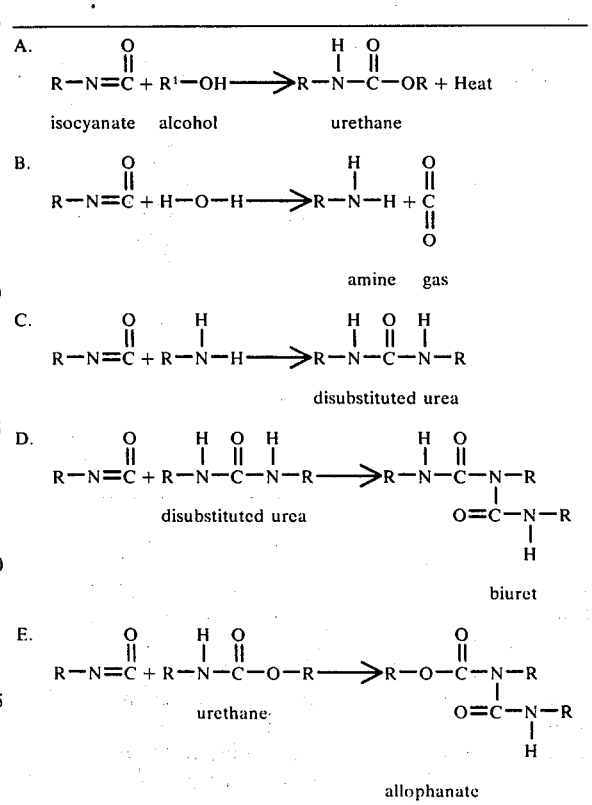

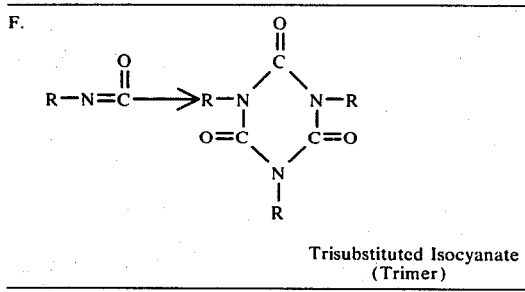

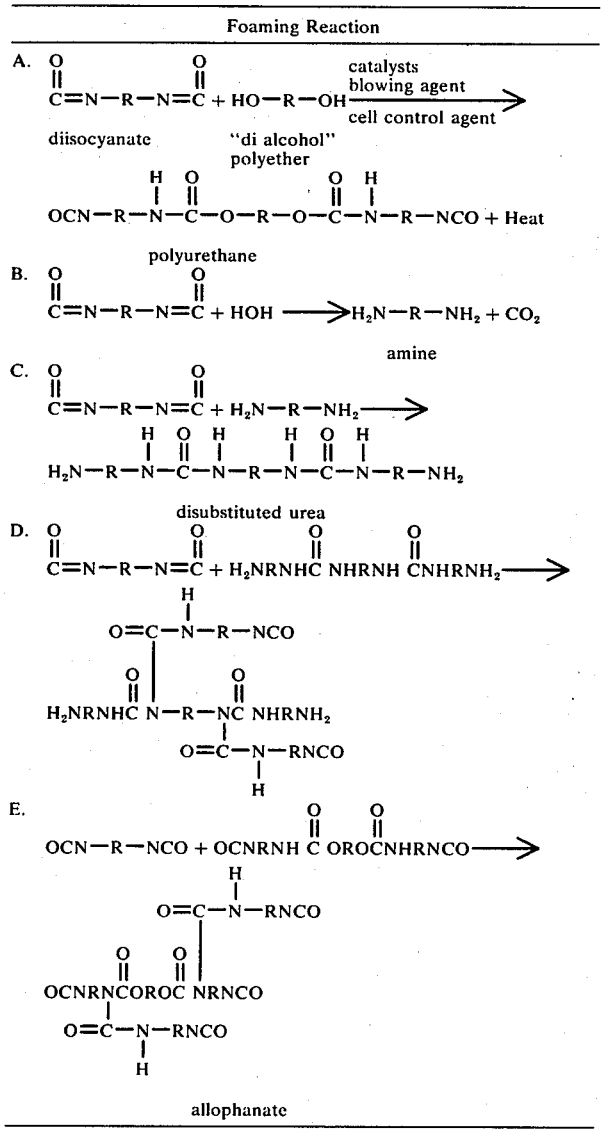

Where reactions with alcohols are indicated above, various types of alcohols may be used in each instance. For example, the alcohol group may be carried by a polyether polyol, a glycol, a tetrol, sucrose and similar carbohydrates, cellulose and cellulosic materials, phenols, polyesters, polylactones, castor-oil and derivatives thereof. Each of these types of substance may have various subgroups, for example polyether polyols may include polyethylene glycol, polypropylene glycol, polytetramethyleneether glycol etc. The compounds may include cross-linking groups and cross-linking agents known to be reactive with polyurethanes may also be used.

DEHUMIDIFYING AND DEACIDIFYING AGENTS

The present invention may make use of dehydrating and deacidifying agents which are combined with the bitumen and/or are introduced into the composition. In general, I prefer to use, for this purpose, an excess of the dehydrating and deacidifying agent over that which is theoretically required, after analysis of the bitumen, to react or cooperate with the latter. The agent may be of any of three principal types, namely the molecular sieves mentioned earlier which absorb or mechanically trap moisture in interstices of the dehydrating agent, absorbants which pick up moisture by surface attraction, and of acid agents which chemically interact to form compounds with water. In many cases, the same agent may be used both as a deacidifying substance and as a dehydrating substance. For example, I may use barium, calcium, magnesium or aluminum oxide, or mixtures thereof, and preferably calcium oxide. Calcium oxide is capable of chemically combining with one molecule of water per molecule of calcium oxide and thus produces calcium hydroxide which is basic and, in turn, is capable of combining with two equivalents of acid.

Anhydrous elongs, activated charcoal, activated aluminas and molecular sieve structures have been found to combine with water in the bitumen in an efficient manner. It has been observed in connection with molecular sieves, that the latter should have a pore size of about 4 A.

PHYSICAL DEHYDRATION

As I have also pointed out previously, the dehydration of the bitumen may be carried out by physical means as well as the chemical techniques noted above. Thus the bitumen and, where necessary, any other ingredients such as plasticizers and fillers, are dehydrated by heating them to an elevated temperature sufficient to volatilize water therefrom. The heating may be carried out just below the boiling point of the bitumen and may be accompanied by a reduction in pressure. Vacuum alone also may be used to reduce the water content. Best results are obtained, however, with azeotropic distillation using benzene or toluene as the azeotrope former.

NEUTRALIZING AGENTS

Where the dehydrating agents are not satisfactory as neutralizing agents, I may add other substances such as alkaline hydroxides, alkaline-earth hydroxides, primary, secondary, tertiary or heterocyclic amines to neutralize the acidity. In general such substances should be provided in an amount less than 0.5% by weight of the polymer.

SPECIFIC EXAMPLES

EXAMPLE I

| Low NCO preolymer for one part sealant | | |
|---|---|---|
| TDI High Acid[1] | 525 | parts by weight |
| P-3000 Diol[2] | 3300 | '' |
| CP-5600 Triol[3] | 6000 | '' |

-continued

| Low NCO preoplymer for one part sealant | |
|---|---|
| Tin Catalyst[4] | 0.05 " |

TDI and P-3000 Diol are heated to 80°C for 2 hours. Then the CP-5600 is added over a period of 2 hours. The tin catalyst is added with some solvent[5] after cooling to 50°C.

EXAMPLE II

| Prepolymer for two component sealant | | |
|---|---|---|
| TDI[1] | 375 | parts by weight |
| MDI[6] | 260 | " |
| P-2000 Diol[7] | 2200 | " |
| CP-4000 Triol[3] | 4500 | " |
| Tin Catalyst[4] | 0.05 | " |

The procedure followed is the same as that of Example I.

EXAMPLE III(A)

| | | |
|---|---|---|
| RT-6 Tar[9] | 100 | parts by weight |
| Tin Catalyst[4] | 0.1 | " |
| BaO[10] | 10 | " |
| Prepolymer Example I | 100 | " |

EXAMPLE III(B)

| | | |
|---|---|---|
| RT-6 Tar[9] | 100 | parts by weight |
| Tin Catalyst[4] | 0.1 | " |
| Prepolymer of Example I | 100 | " |

EXAMPLE III(C)

| | | |
|---|---|---|
| CP-524[11] | 975 | parts by weight |
| Aromatic Oil[12] | 100 | " |
| Tin Catalyst[4] | 2 | " |
| Clay[13] | 200 | " |
| Carbon Black | 150 | " |
| Guardthane 513[14] | 974 | " |
| Guardthane 32D[15] | 26 | " |

For Examples III(B) and III(C) the tar and oil and fillers are mixed in order in a paint mill, then allow to stand for 24 hours in a closed system. Then the prepolymers were incorporated and mixed thoroughly under a blanket of Nitrogen. Excessive foaming occurred which made it necessary to place it in a can with a venting valve on the lid to avoid explosion of the can.

EXAMPLE III(D)

| | | |
|---|---|---|
| CP-524[11] | 975 | parts by weight |
| Aromatic Oil[12] | 100 | " |
| Tin Catalyst[4] | 2 | " |
| Clay[13] | 200 | " |
| Carbon Black | 150 | " |
| Calcium Oxide | 100 | " |
| Guardthane 513[14] | 975 | " |
| Guardthane 32D[15] | 26 | " |

In Examples III(A) and III(D), the tar, oil, fillers and calcium oxide or barium oxide are mixed in order in a paint mill, then allowed to stand for 24 hours in a closed system. Then the prepolymer were incorporated and mixed thoroughly under nitrogen blanket. In this experiment there was no foaming.

EXAMPLE IV

The same ingredients and procedure of Example III(D) was used except 50 ppw (pounds) of calcium oxide were added. There was very slight foam, and gas evolution which subsided upon mixing but the final composition was stable over 6 months.

EXAMPLE V

The same ingredients of Example III(D) were used, but the procedure was changed slightly. Instead of waiting 24 hours, there was only 1 hour waiting prior to the incorporation of the prepolymers. This resulted in heavy gasing which subsided, but gave a product of 2 months stability. This indicated that the $Ca(OH)_2$ formation was not complete in 1 hour.

EXAMPLE VI

Example V was repeated, but the procedure was changed by waiting 3 hours instead of 1 hour. This procedure gave a stable composition for over 6 months. However, very minute gasing occurred which indicates that there was some slight quantity of unreacted water in the composition. However, when this process was repeated and the waiting time was 4 hours there was no noticeable gasing or evolution of $CO_2$.

EXAMPLE VII

The following compositions were prepared as described by Example III(B) to form 1 part compositions which were cast as roofing and self-supporting layers. The physical properties are given in TABLE I below:

| A | Parts by Weight |
|---|---|
| CP-439[17] | 1000 |
| Aromatic Oil[12] | 100 |
| Guardset No. 1[18] | 2 |
| Asbestos 7TF[18] | 50 |
| Black Raven 30[20] | 100 |
| Ba Oxide | 75 |
| Prepolymer from Example I | 1000 |

| B | Parts by Weight |
|---|---|
| CP-524[11] | 800 |
| Aromatic Oil[12] | 100 |
| Guardset No. 1[18] | 1 |
| Antimony Oxide | 100 |
| Tricresylphosphate | 100 |
| RG-244 asbestos[19] | 5 |
| Prepolymer from Example I | 1000 |

| C | Grams |
|---|---|
| Neville Plasticizer X743[10] | 200 |
| Enjoy CTLA Polymer[21] | 200 |
| Titanium pigment | 100 |
| Red iron oxide synthetic | 100 |
| D.B.T.D.[22] | 1 |
| Toluol | 50 |
| Guardthane 32D[15] | 50 |
| Prepolymer for Example I | 650 |

| D | Grams |
|---|---|
| Neville X743[10] | 800 |
| CTLA Polymer[21] | 200 |
| Titanium Pigment | 100 |
| Red iron oxide synthetic | 100 |

-continued

| | |
|---|---|
| D.B.T.D.(22) | 1 |
| Toluol | 50 |
| Molecular Sieve 5A | 25 |
| Guardthane 32D | 50 |
| Prepolymer for Example I | 650 |

E

Same as (D), except 25 grams of activated alumina was used instead of molecular sieve 5A.

F

Same as (E), except 25 grams of activated charcoal was used instead of activated alumina.

G

Same as (D), except molecular sieve 3A was used instead of molecular sieve 5A.

H

Same as (D), except that molecular sieve 4A was used instead of molecular sieve 5A.

I

Same as (H) except that the molecular sieve used was 7A instead of 4A.

TABLE I

| Composition | Cure Time (Hours) | Shelf Stability (Months) | Tensil psi | Elongation % |
|---|---|---|---|---|
| C | 24 | ½ | 200 | 340 |
| D | 36 | 7 | 230 | 330 |
| E | 30 | 3 | 220 | 350 |
| F | 48 | 2 | 200 | 400 |
| G | 24 | 2 | 230 | 400 |
| H | 40 | 8 | 210 | 360 |
| I | 40 | 9 | 180 | 370 |

EXAMPLE VIII 1000 grams of Neville plasticizer X473(10) is added to a closed double arm mixer equipped with Jacked and low pressure steam and reflux cooled condenser. 250 grams of $CaCO_3$ and 50 grams of asbestos 7TS(24) were added under mixing before any heat was applied. 70 grams of Mobisol 44(25) and 50 grams of maleate ester were added. The mixer was closed and heated to 200°F under 20mm vacuum for 2 hours. Then the mixer was cooled to 100°-110°F before the addition of Guardthane 523(26) a low NCO polyether MDI/TDI prepolymer (minimum NCO = 2.5–3% by weight). The mixed composition is kept under cooling and vacuum. Finally ½ gram of dibutyltriacetate was incorporated. The total mixed composition was discharged under nitrogen to prevent moisture pickup.

The above composition has passed one year of shelf stability while curing characteristics still are outstanding.

EXAMPLE IX

Same as in Example VIII. The only difference is the use of 5% toluol on total weight to aid in azeotropic stripping of moisture, acids, and low molecular weight phenols.

EXAMPLE X

The same composition as in Example IX as used, except that a temperature up to 230°F is employed without vacuum.

EXAMPLE XI

The same as Example X except that a polyester prepolymer of 2200 molecular weight of 2.3 functionality is used.

EXAMPLE XII

The same as in Example X except that a polylactone prepolymer of 2200 molecular weight of 2.3 functionality is used.

I have mentioned that alkali-earth metal oxides act as dehydration agents. Other chemicals act as chemical dehydrating agents through formation of by-products or through crystallization. The following Examples illustrate the use of organic silane with hydrolyzable groups represented by the following formula

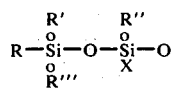

when R, R', R'' and R''' are selected from the following groups methyl rethyl, acryl, vinyl and x is selected from hydrogen, hologen, epoxide, mercaptide, as manufactured th the Silicone Division of Union Carbide. For example, while the use of silicone has been described in other references as an adhesive promoter, it is also a dehydrating agent albeit too expensive for some commercial applications.

EXAMPLE XIII

| | | |
|---|---|---|
| Ebony (Neville Resin) (26) | 100 | parts by weight |
| Tuluol | 15 | " |
| D.B. Oil (Baker)(27) | 5 | " |
| RG-244(28) | 3 | " |
| Silane A-1100(29) | 3 | " |
| Guardthane CS-60(30) | 150 | " |

EXAMPLE XIV

| | | |
|---|---|---|
| Ebony (Neville)(26) | 100 | parts by weight |
| Toluol | 15 | " |
| DB Oil(27) | 5 | " |
| Epoxide (180 Equiv.) | 3 | " |
| Guardthane GC-75(31) | 150 | " |
| Dibutyl Tin Mercaptide | 0.2 | " |

EXAMPLE XV

| | | |
|---|---|---|
| CP-250[32] | 1000 | parts by weight |
| Xylol | 100 | " |
| Carbon Black | 120 | " |
| CaCl$_2$ (Shot) | 7 | " |
| Guardthane CS-50[33] | 500 | " |
| Prepolymer (Example 1) | 2 | " |
| DABCO 33V[34] | 2 | " |

(The above mixture is pebble milled for 1 hour before the polymers are added.)

EXAMPLE XVI

| | | |
|---|---|---|
| CP-439 (High Acid Content)[35] | 10,000 | parts by weight |
| Tuluol | 50 | " |
| Epoxide Resin (180 equiv.) | 15 | " |
| Trimethyl Piperazine Talc | 2 | " |
| Talc | 100 | " |
| Ground Limestone | 500 | " |
| Thermo T-31[36] | 1 | " |
| Prepolymer (Example 1) | 1000 | " |

(All ingredients were mixed for 2 hours prior to the addition of prepolymer.)

The epoxide resin consumes free available carboxy acids and improves adhesion to wet surfaces especially with the incorporation of small amounts of castor oil.

| Example Superscripts | |
|---|---|
| 1 | toluene di-isocyanate 80/20 |
| 2 | polyoxypropylene, molecular weight 3000, 2 OH/molecule |
| 3 | polyoxypropylene, molecular weight 5600, 3 OH/molecule |
| 4 | dibutyltinalaurate or dibutyltinacetate |
| 5 | toluene |
| 6 | methylene diphenyl di-isocyanate |
| 7 | polyoxypropylene, m.w. 2000, 2 OH/molecule |
| 8 | polyoxypropylene, m.w. 4000, 3 OH/molecule |
| 9 | liquid tar, m.p. 20°C, CS$_2$ insol. 5–7%, b.p. > 400°C. |
| 10 | Barium oxide fine grade |
| | Neville plasticizer-petroleum distillate, KB > 80. |
| 11 | Same as 9 |
| 12 | KB > 80, f.p. < 0°C., flash point > 300°F. |
| 13 | 200 mesh aluminum silicate clay |
| 14 | polyisocyanate prepolymer/triol NCO ca. 3.2% |
| 15 | polyisocyanate prepolymer/triol NCO ca. 31% |
| 16 | see 12 |
| 17 | see 9, CS$_2$ insol. < 5% |
| 18 | same as 4, stabilized |
| 19 | asbestos fiber, international designation - 7. |
| 20 | fine, easy disperse carbon black |

| Example Superscripts | |
|---|---|
| 21 | unsaturated high m.p. residue of ethylene polymerization. |
| 22 | see 4 |
| 24 | see 19 |
| 25 | see 12 |
| 26 | petrochemical byproduct kb > 80 m.p. ca. 80°C. |
| 27 | refined castor oil |
| 28 | see 19 |
| 29 | aminotrimethoxysilane |
| 30 | polyisocyanate prepolymer 60% in xylol, NCO 9–11% |
| 31 | polyisocyanate prepolymer 75% solids, NCO ca. 13 |
| 32 | see 9, m.p. 70°C |
| 33 | 50% solution of 30 |
| 34 | triethylenediamine, 33% solution |
| 35 | see 32, less than 5% CS$_2$ insoluble. |
| 36 | mercaptotinlaurate. |

I claim:

1. A moisture-curable sealing composition comprising a polyurethane prepolymer, a dehydrated and deacidified bitumen selected from the group which consists of dehydrated and deacidified tars, pitches and asphalts, said bitumen being a tar having a boiling point between about 195° and 340°C and said polyurethane prepolymer having a molecular of 1000 to 12,000 and an isocyanate NCO content of up to 20% by weight, and a dehydrating agent mixed into said composition in an amount in excess of that theoretically required to remove all of the moisture of said bitumen, said dehydrating agent being selected from the group which consists of barium, calcium, magnesium and aluminum oxides and mixtures thereof.

2. The composition defined in claim 1 wherein said bitumen is present in an amount of at least 50% by weight of the composition.

3. The composition defined in claim 2 wherein said composition further includes an alkyl-tin catalyst for urethane polymerization, said catalyst being present in an amount ranging between 0.05 and 2.5% by weight of said composition.

4. The composition defined in claim 3 wherein said composition is prepared in a single package and said polyurethane prepolymer has a molecular weight of 2000 to 5000 and an isocyanate NCO content below of about 5% by weight of the prepolymer.

5. The composition defined in claim 3 wherein said composition is formed at an application site by mixing two separately packaged components, one of said components containing said bitumen, the other of said components containing said prepolymer.

* * * * *